United States Patent
Santos et al.

(10) Patent No.: US 8,707,986 B2
(45) Date of Patent: Apr. 29, 2014

(54) PRESSURE REDUCING VALVE

(75) Inventors: Francis Santos, San Antonio, TX (US);
Phillip B. Frazier, Helotes, TX (US)

(73) Assignee: Taprite-Fassco Manufacturing, Inc., San Antonio, TX (US)

(*) Notice: Subject to any disclaimer, the term of this patent is extended or adjusted under 35 U.S.C. 154(b) by 258 days.

(21) Appl. No.: 13/188,127

(22) Filed: Jul. 21, 2011

(65) Prior Publication Data
US 2012/0018658 A1    Jan. 26, 2012

Related U.S. Application Data

(60) Provisional application No. 61/366,307, filed on Jul. 21, 2010.

(51) Int. Cl.
*F16K 31/12* (2006.01)
*G05D 16/06* (2006.01)

(52) U.S. Cl.
CPC .................. *G05D 16/0658* (2013.01)
USPC ............. 137/505.29; 137/505.41; 137/505.42

(58) Field of Classification Search
CPC ............ G05D 16/063; G05D 16/0638; G05D 16/0644; G05D 16/0655; G05D 16/0658; G05D 16/0686
USPC ............. 137/505.38, 505.39, 505.41, 505.42, 137/116.5
See application file for complete search history.

(56) References Cited

U.S. PATENT DOCUMENTS

| | | | | |
|---|---|---|---|---|
| 1,739,926 A | * | 12/1929 | Stettner | 137/334 |
| 1,918,720 A | * | 7/1933 | Stettner | 137/505.42 |
| 3,612,618 A | * | 10/1971 | Swanson | 303/9.73 |
| 3,812,877 A | * | 5/1974 | Fleischhacker et al. | 137/505.42 |
| 4,111,222 A | * | 9/1978 | Hassell | 137/69 |
| 4,660,597 A | * | 4/1987 | Cowles | 137/505.42 |
| 5,979,409 A | * | 11/1999 | Robinson | 123/463 |
| 7,082,963 B2 | * | 8/2006 | Ando | 137/505.39 |
| 7,137,404 B2 | * | 11/2006 | Ejiri | 137/505.29 |
| 7,357,143 B2 | * | 4/2008 | Cho et al. | 137/14 |
| 2001/0009161 A1 | * | 7/2001 | Berger | 137/116.5 |

OTHER PUBLICATIONS

JKDivers.net, Regulators, Unbalanced Piston Valve, Jun. 25, 2010.

* cited by examiner

*Primary Examiner* — Craig Schneider
*Assistant Examiner* — Jessica Cahill
(74) *Attorney, Agent, or Firm* — Jackson Walker, LLP

(57) ABSTRACT

A flow control device is disclosed. The flow control device comprises a pressure reducing valve. The pressure reducing valve comprises a valve body having at least an inlet port on a high side and an outlet port on a low side and having walls defining a regulating chamber, the outlet port in fluid communication with the regulating chamber. A diaphragm assembly is provided having a diaphragm and a stem for engaging the diaphragm. The stem has a base and a connecting arm. The diaphragm engages the main valve at a perimeter thereof so as to partially enclose the regulating chamber. A valve controlled opening cooperating with the connecting arm of the stem is located between the inlet port and the regulating chamber. The valve controlled opening is adapted to adjustably restrict flow of gas between the inlet port and the regulating chamber responsive to movement of the connecting arm.

10 Claims, 4 Drawing Sheets

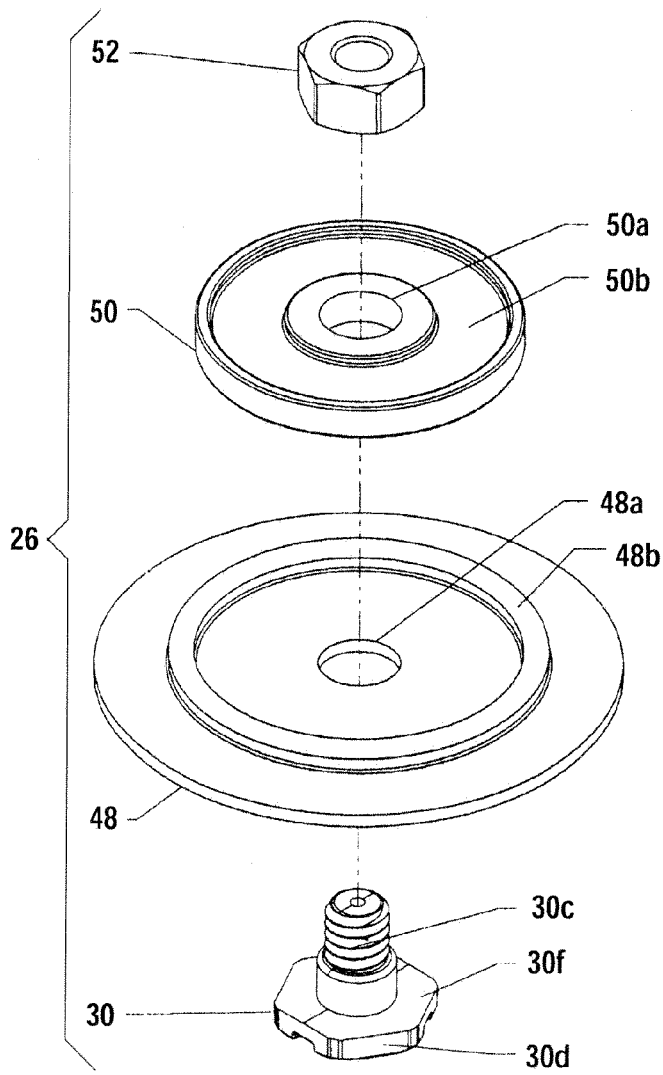
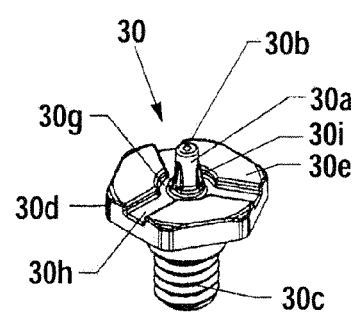
FIG 3
FIG 4

PRESSURE REDUCING VALVE

This application claims the benefit of and incorporates by reference U.S. Patent Application Ser. No. 61/366,307, filed Jul. 21, 2010.

FIELD OF THE INVENTION

Flow control devices; namely, a pressure reducing valve.

BACKGROUND OF THE INVENTION

Pressure reducing valves are used to allow high pressure fluid supply lines or compressed gas tanks to be reduced to safe, usable pressures for various applications. A pressure reducing valve may be part of a gas pressure regulator, for example, a pressure regulator, to match the flow of gas through the valve to the demand placed on it.

SUMMARY OF THE INVENTION

A pressure reducing valve comprising a valve body having at least an inlet port on a high side and an outlet port on a low side and having walls defining a regulating chamber, the outlet port in fluid communication with the regulating chamber. A diaphragm assembly is provided having a diaphragm and a stem for engaging the diaphragm. The stem has a base and a connecting arm. The diaphragm engages the main valve at a perimeter thereof so as to partially enclose the regulating chamber. A valve controlled opening cooperating with the connecting arm of the stem, is located between the inlet port and the regulating chamber. The valve controlled opening is adapted to adjustably restrict the flow of gas between the inlet port and the regulating chamber responsive to movement of the connecting arm. A main spring is provided for engaging the diaphragm and urging it toward valve controlled opening. The base of the stem includes a lower surface that is channeled so as to assist the flow of gas from the valve controlled opening to the regulating chamber.

BRIEF DESCRIPTION OF THE DRAWINGS

FIG. 1A through Section A-A, FIG. 1B through Section B-B.

FIG. 1D in an open position; FIG. 1E in a closed (gas not flowing) position.

FIG. 2A from the top; FIG. 2B from the bottom.

FIG. 3 is an exploded side perspective view from above the diaphragm assembly.

FIG. 4 is a bottom side perspective view of the stem.

DETAILED DESCRIPTION OF THE PREFERRED EMBODIMENT

Figures 1A, 1B:
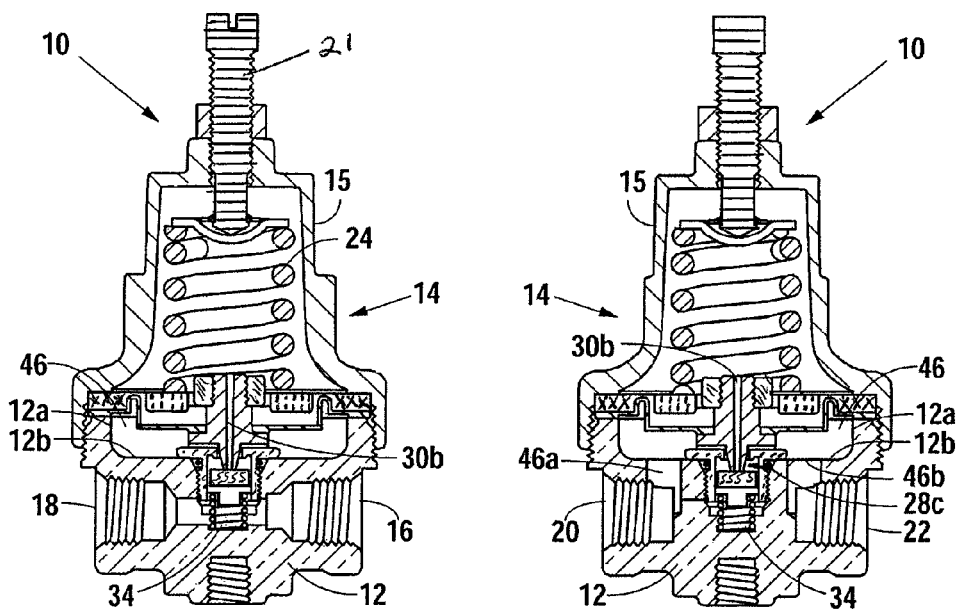
FIGS. 1A and 1B are cross-sectional views of the pressure reducing valve in an open (gas flowing) position.
Figure 1C:
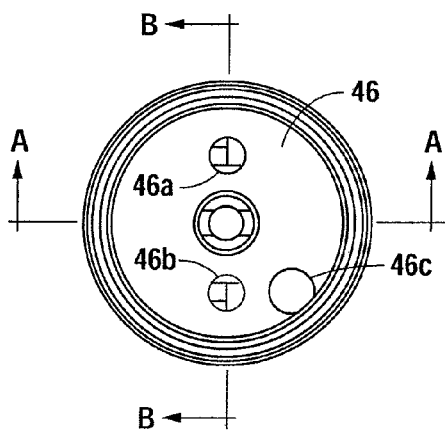
FIG. 1C is a top elevational view of the valve body.
Figure 1D:
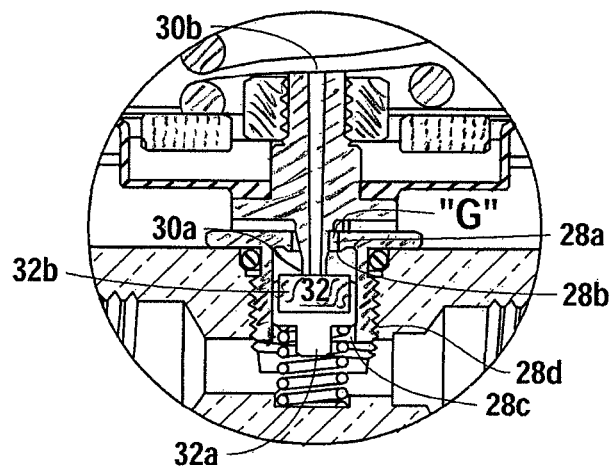
FIGS. 1D and 1E are detailed views of the valve seat.
Figure 1E:
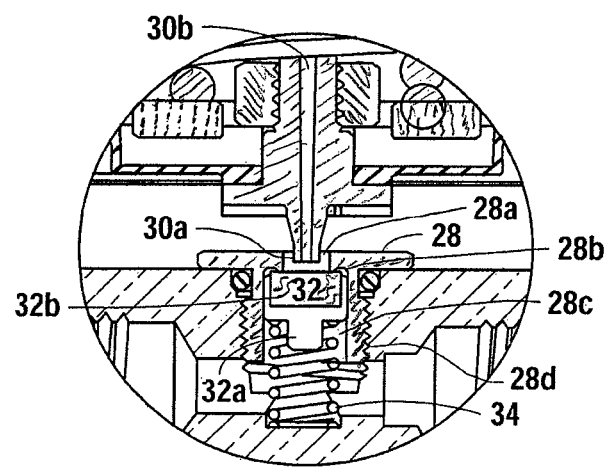
Figures 2A, 2B:
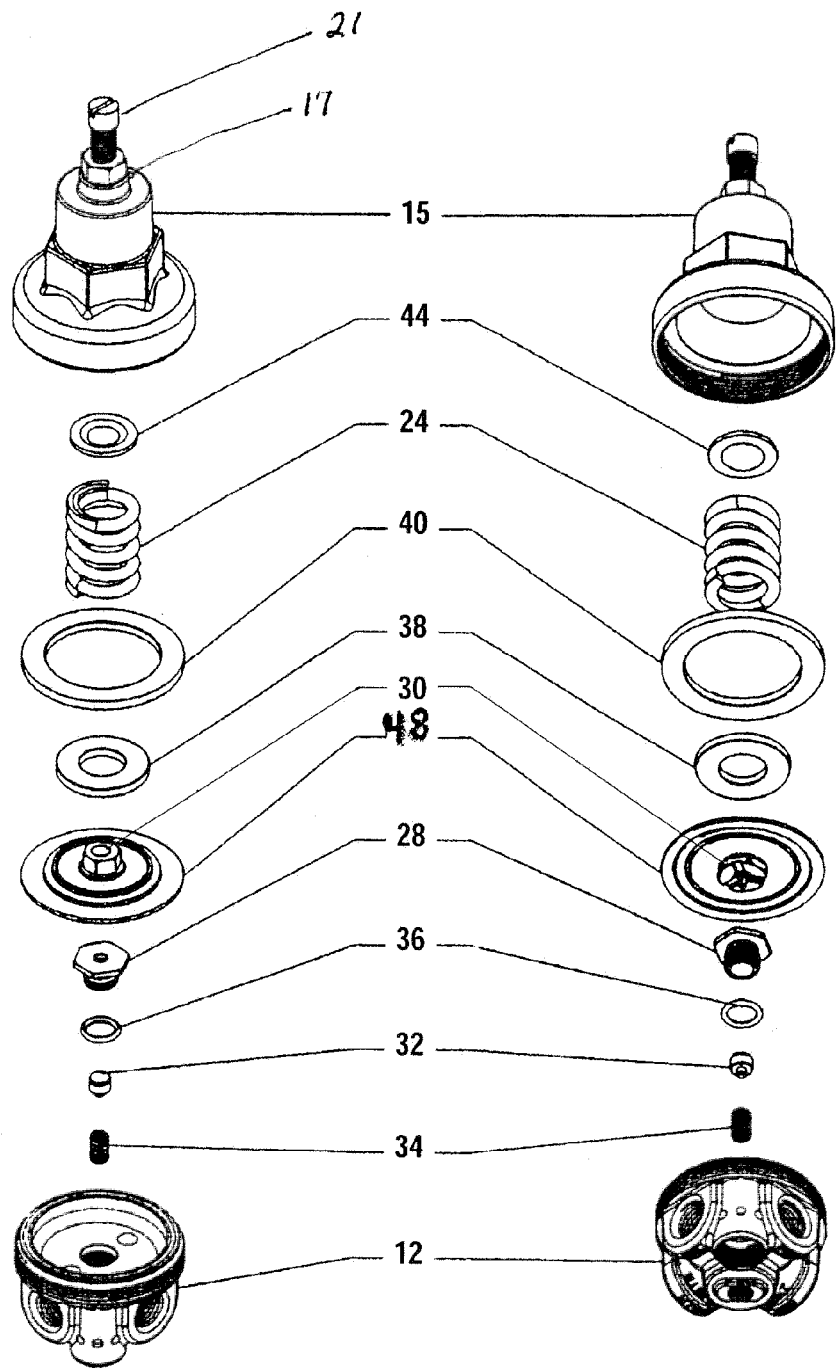
FIGS. 2A and 2B are exploded side perspective views of the pressure reducing valve.

FIGS. 1A, 1B, 1C, 1D, and 1E as well as FIGS. 2A and 2B, illustrate various views of Applicants' pressure reducing valve 10. Pressure reducing valves are known in the gas flow control industry for stepping down or reducing a high pressure gas to a set lower pressure at an outlet port. For example, compressed gas cylinders, when full, can provide for compressed gas up (for example, 3000 psi of $CO_2$) to a pressure reducing valve 10, such as illustrated. This valve will in turn provide a step down pressure at an outlet of, for example, 160 lbs. The pressure reducing valve 10 allows gas under pressure to flow through the valve from the high end to the low end when the pressure at the low end drops below its set pressure, here, for example, 160 lbs.

Turning now to the general construction of Applicants' pressure reducing valve 10, it is seen to have a valve body 12, typically made of brass. A bonnet assembly 14 is threadably engaged to the valve body in a gas sealing manner.

Turning back to the valve body 12, it is seen to have a threaded gas inlet port 16 for engaging the high side pressure source, typically a high pressure compressed gas tank for holding a compressed gas, such as $CO_2$. Valve body 12 also includes a high side pressure gauge port 18 or gauge for measuring the high side source pressure. As the tank (not shown) is depleted through feeding the downstream device or system (not shown), pressure from the source will drop. Gauge port 18 is for a gauge to measure the high side (source) pressure. Outlet port 22 is provided in valve body 12 for supplying a downstream device at a regulated set or reduced pressure, here, for example, 160 lbs. Also included in valve body 12 is an outlet gauge port for indicating the working pressure, that is for an outlet pressure gauge (not shown), to provide an indication of the regulated outlet pressure, here, typically about 160 lbs., for example.

Turning back to bonnet assembly 14, and with reference to FIGS. 1A, 1B, 2A, and 2B, it is seen to include a bonnet housing 15, with an interior dimensioned to receive a main spring 24 which resides therein. A removed end of the main spring 24 is in contact with an outer surface of a diaphragm assembly 26 and a near end to adapter 44. Diaphragm assembly 26 is generally circular and has an outer perimeter which is sandwiched between valve body 12 and bonnet housing 15 as seen in FIG. 1A. Diaphragm assembly 26 includes a stem 30 engaged therewith and will move along the longitudinal axis of the valve 10 as the diaphragm flexes. Stem 30 includes connecting arm 30a, which may have gussets 30i. Arm 30a has a centrally located orifice 28a of an orifice screw 28, which orifice screw is threadably secured into the body as seen in FIG. 1A with an O-ring 36 sealing orifice screw 28 to valve body 12.

It is seen in detail view in FIGS. 1D and 1E, how connecting arm 30a, typically cylindrical, moves freely in orifice 28a of orifice screw 28. Moreover, it is seen that orifice screw 28 includes a downward depending lip 28b, around orifice 28a.

Adjacent the removed end of connecting arm 30a is located a cylindrical movable seal 32, which is urged against the removed end of connecting arm 30a by a seal spring 34. Moreover, it is seen that seal 32 is dimensioned to be received within seal cavity 28c of orifice screw 28, which sealed cavity has threaded walls 28d of orifice screw 28. Stem 30 is seen to have a connecting arm channel 30b running longitudinally on an exterior surface therethrough from the removed end of connecting arm 30a through diaphragm assembly 26 as illustrated in FIG. 1A. Connecting arm channel 30b provides for pressure relief when one adjusts output or working pressure.

Turning back to bonnet assembly 14, it is seen in FIGS. 1A and 1B that bonnet assembly 14 is dimensioned to substantially enclose main spring 24 and to locate main spring 24 adjacent an upper surface of the diaphragm assembly 26 as illustrated. Bonnet housing 15 includes a relief hole 17 for relief of pressure above the diaphragm assembly 26 (see FIG. 2A). An adjusting screw 21 is provided to selectively adjust pressure spring 24 applied to the upper surface of diaphragm 48. Bonnet assembly 14 also includes washer 38, which is sandwiched between the diaphragm assembly upper surface and the removed end of main spring 24 to prevent direct contact and abrasion of the diaphragm assembly by the main spring. Washer 40 is also provided and can be placed between the bonnet housing 15 and the main body 12, along with the outer perimeter of the diaphragm assembly as illustrated, such that when threadably engaging the bonnet housing 14 to valve body 12, a tight pneumatic seal is provided by compressing these elements between the bonnet housing 15 and the main body 12.

A regulating chamber 46 is seen, which is defined in part by sidewalls 12a and cross walls 12b of the valve body and by the underside of the diaphragm assembly 26. The regulating chamber 46 includes outlet ports 46a/46b/46c in the main body 12. Outlet port 46a provides fluid communication between the regulating chamber 46 and gauge port 20. Outlet port 46b provides fluid communication between the regulating chamber 46 and outlet port 22 (see FIG. 1B). Outlet port 46c provides fluid communication between the regulating chamber 46 and a safety or blowout prevention valve (not shown).

The condition of the valve seen in FIGS. 1A and 1B is open. That is to say, gas pressure is flowing through the valve from high to low by entering valve body 12 at inlet port 16 and passing up through orifice 28a into regulating chamber 46 and out through port 46b and outlet port 22. In this "open" position, seal 32 is maintained off or spaced away from circular lip 28b of orifice screw 28, thus allowing gas to flow through the valve. In this condition, a device downstream of outlet port 22 is consuming gas from the high pressure source. However, when demand downstream decreases or ceases, then back pressure will develop until pressure in regulating chamber 26 is sufficient to raise the stem up as seen in FIG. 1E, a sufficient distance, such that seal 32 is now seated on lip 28b and gas can no longer flow through valve 12. Seal 32 may be comprised of a stainless steel housing 32a dimensioned to receive a durable seat 32b made from a synthetic or other suitable material. Seat 32b is dimensioned to make contact with lip 28b when the valve is in a closed position.

FIG. 3 illustrates the elements of the diaphragm assembly 26. Diaphragm assembly 26 is seen to include four cooperating elements: stem 30, diaphragm 48 (preferably convoluted), piston 50, and nut 52. The advantage of the convoluted diaphragm is that it typically does not stretch, after repeated use, like a flat diaphragm does. Moreover, it is seen that nut 52 may engage threaded arm 30c of stem 30, which is dimensioned to pass through central hole 48a of diaphragm 48 and central hole 50a of piston 50. Threaded nut 52 will sandwich piston 50 so that it is seated within the space created by convoluted portion 48b of diaphragm 48. Moreover, it may be seen that there is typically a recessed portion 50b on the upper surface of piston 50 dimensioned to receive washer 38 as seen in FIG. 2A.

One of the novel features of Applicants' present device is in the structure and function of stem 30. Stem 30 is seen to transmit changes in the diaphragm position to the seat. Moreover, it is seen that connecting arm 30a is dimensioned to be generally cylindrical (and may be slightly tapered) and received through circular orifice 28a with an annular gap "G" therebetween (see FIG. 1D). This annular gap will allow gas to pass therethrough when seal 32 is displaced or lifted off lip 28b. It is noted that a tight gap will be more restrictive of flow than a wide gap. Gaps may be preferably about 0.035"/side or a range of 0.020" to 0.050."

With further reference to FIGS. 1A, 1B, 3, and 4, it is seen that connecting arm 30a projects downward from the underside of stem 30 and, along the longitudinal axis thereof, threaded arm 30c projects upward. An outwardly extending lateral base 30d extends from the longitudinal axis that lays between the removed ends of the stem. Base 30d is seen to have a flat, first or upper surface 30f and a channeled, second or lower surface 30e. When diaphragm assembly 26 is together, it is seen that upper surface 30f lays adjacent the lower surface of diaphragm 48. When the gas is flowing through opening 28a, the seal being off the lip, channeled lower surface 30e lays near, on, adjacent or next to the typically flat top surface of orifice screw 28 (see FIG. 1D).

Turning now to channeled lower surface 30e, it is seen to have a central recess 30g surrounding the base of the connecting arm 30a, that is, where the connecting arm 30a joins base 30d. Central recess 30g may be circular and may have a diameter typically greater than the diameter of orifice 28a. Further, it is seen that, typically, a multiplicity of radial channels 30h extend outward from the outer perimeter of central recess 30g to the outer perimeter of the base. The radial channels 30h may be straight (shown), curved (not shown), or any other suitable shape. Typically there are more than one radial channels, preferably three or four equally spaced.

The channeled structure of the lower surface, including the central recess and the multiplicity of radial channels (preferably more than one), tends to generate unobstructed gas flow at a given pressure differential between inlet port 16 and outlet port 22. It has been found that at some pressure differentials, as much as 20% more gas flow is generated when using the recessed sections or channels of the lower surface, rather than a plane or flat lower surface.

It is shown that the channeled lower surface generates more gas flow. Applicants disclose an arrangement with a recess and three channels. However, any number of channels, in any arrangement, will work. Moreover, while a recess is preferred, radial channels alone will work.

Although the invention has been described with reference to a specific embodiment, this description is not meant to be construed in a limiting sense. On the contrary, various modifications of the disclosed embodiments will become apparent to those skilled in the art upon reference to the description of the invention. It is therefore contemplated that the appended claims will cover such modifications, alternatives, and equivalents that fall within the true spirit and scope of the invention.

The invention claimed is:

1. A pressure reducing valve comprising:
   a valve body having at least an inlet port on a high pressure side and an outlet port on a low pressure side and having walls defining in part a regulating chamber, the outlet port in fluid communication with the regulating chamber;
   a diaphragm assembly having a diaphragm, a stem engaging the diaphragm, the stem with a base, the base having a base diameter, the base having a substantially flat bottom, an outer perimeter and a connecting arm, the connecting arm extending generally perpendicular to the base, the diaphragm having a perimeter, the perimeter for engaging the valve body so as to partially enclose the regulating chamber;
   a valve controlled assembly having a valve opening, the valve opening having a diameter smaller than the diameter of the base, cooperating with the connecting arm of the stem, the valve opening having a stationary depending lip located between the inlet port and the regulating chamber, the valve controlled assembly including a moveable seat with a flat portion, the seat biased towards the lip, the valve controlled assembly adapted to restrict the flow of gas between the inlet port and the regulating chamber responsive to movement of the connecting arm in the valve controlled assembly; and a main spring for engaging the valve body and the diaphragm assembly and urging the diaphragm and the stem toward the valve opening;

wherein the base of the stem includes a lower surface that is channeled with a multiplicity of gas flow restricting channels so as to assist the flow of gas from the valve controlled assembly to the regulating chamber, when the connecting arm urges the seat off the lip;

wherein the flat bottom of the base of the stem further includes a central recessed portion with substantially closed curved side walls;

wherein the channels of the base of the stem are radially arranged about the connecting arm so as to begin at channel openings in the otherwise substantially closed curved side walls of the recessed portion and terminate at openings in the outer perimeter, and wherein the channels terminate at the outer perimeter of the base, wherein a floor of each channel is flush with a floor of the central recessed portion.

2. The pressure reducing valve of claim 1, wherein the channels of the base of the stem are curved.

3. The pressure reducing valve of claim 1, wherein the channels of the base of the stem are straight.

4. The pressure reducing valve of claim 1, wherein the multiplicity of channels of the base comprises three.

5. The pressure reducing valve of claim 1, further including a gap between the connecting arm of the stem and the valve open, the gap I the range of 0.020 to 0.050 inches.

6. The pressure reducing valve of claim 1, wherein the connecting arm of the stem includes a bore extending therethrough.

7. The pressure reducing valve of claim 1, wherein the outer perimeter of the base comprises a polygon having a multiplicity of straight sides.

8. The pressure reducing valve of claim 7, wherein the multiplicity of channels terminate at some of the multiplicity of straight sides of the outer perimeter of the base.

9. A pressure reducing valve comprising:

a valve body having at least an inlet port on a high pressure side and an outlet port on a low pressure side and having walls defining in part a regulating chamber, the outlet port in fluid communication with the regulating chamber;

a diaphragm assembly having a diaphragm, a stem engaging the diaphragm, the stem with a base, the base having an outer perimeter and a connecting arm, the connecting arm extending generally perpendicular to the base, the diaphragm having a perimeter, the perimeter for engaging the valve body so as to partially enclose the regulating chamber;

a valve controlled assembly having a valve opening cooperating with the connecting arm of the stem, the opening located between the inlet port and the regulating chamber, the valve controlled assembly including a moveable seat with a flat portion and a depending stationary lip, the seat biased towards the lip for engagement therewith, the valve controlled assembly adapted to restrict the flow of gas between the inlet port and the regulating chamber responsive to movement of the connecting arm in the valve controlled assembly; and a main spring for engaging the valve body and the diaphragm assembly and urging the diaphragm and the stem toward the valve opening;

wherein the base of the stem includes a lower surface that is channeled with a multiplicity of gas flow restricting channels so as to assist the flow of gas from the valve controlled assembly to the regulating chamber, when the connecting arm urges the seat off the lip;

wherein the lower surface of the base of the stem further includes a central recessed portion;

wherein the connecting arm of the stem includes a bore extending therethrough; and wherein the channels begin at the central recessed portion and terminate at the outer perimeter, wherein a floor of each channel is flush with a floor of the central recessed portion.

10. The pressure reducing valve of claim 9, wherein the channels of the base of the stem are radially arranged about the connecting arm.

\* \* \* \* \*